United States Patent [19]
Brown

[11] Patent Number: 5,498,083
[45] Date of Patent: Mar. 12, 1996

[54] SHIMMED THREE LOBE COMPLIANT FOIL GAS BEARING

[75] Inventor: William R. Brown, Slatington, Pa.

[73] Assignee: Air Products and Chemicals, Inc., Allentown, Pa.

[21] Appl. No.: 356,426

[22] Filed: Dec. 15, 1994

[51] Int. Cl.$^6$ ............................................. F16C 32/06
[52] U.S. Cl. ............................ 384/106; 384/103; 29/898.02
[58] Field of Search ..................... 384/103, 104, 384/105, 106; 29/898.02

[56] References Cited

U.S. PATENT DOCUMENTS

| | | | |
|---|---|---|---|
| 3,893,733 | 7/1975 | Silver et al. | 384/106 |
| 4,082,375 | 4/1978 | Fortmann | 384/105 |
| 4,133,585 | 1/1979 | Licht | 384/103 |
| 4,167,295 | 9/1979 | Glaser | 384/105 |
| 4,208,076 | 6/1980 | Gray et al. | 384/105 |
| 4,213,657 | 7/1980 | Gray | 384/105 |
| 4,262,975 | 4/1981 | Heshmat et al. | 384/119 |
| 4,300,806 | 11/1981 | Heshmat | 384/103 |
| 4,465,384 | 8/1984 | Heshmat et al. | 384/106 |
| 4,502,795 | 3/1985 | Klaass | 384/106 X |
| 4,549,821 | 10/1985 | Kawakami | 384/106 X |

FOREIGN PATENT DOCUMENTS 101316  6/1985  Japan ............................ 384/103

Primary Examiner—Thomas R. Hannon
Attorney, Agent, or Firm—Willard Jones, II

[57] ABSTRACT

A method and apparatus for increasing the load capacity and damping capability of a three pad compliant foil gas bearing by establishing a gas pressure force between each pad and a shaft supported by a sleeve containing the bearings.

9 Claims, 4 Drawing Sheets

SHIMMED THREE LOBE COMPLIANT FOIL GAS BEARING

FIELD OF THE INVENTION

The present invention pertains to compliant foil gas bearings and more particularly to dynamic compliant foil gas bearings.

BACKGROUND OF THE INVENTION

Many industrial applications require the use of high-speed turbo machinery. For example, in the production of industrial gases such as oxygen, nitrogen, argon, and the like via liquefaction and fractional distillation of air, turbo expanders are used to reduce pressure of the air and/or the individual gaseous components.

Compliant foil gas bearings have been applied successfully to a wide range of high speed rotating machinery. These gas foil type bearings are especially attractive to turbo expanders because they eliminate the lube oil system, simplify the seal gas system, simplify the control system, offer lower frictional power loss, and provide greater flexibility of machine installation.

Such devices are shown in U.S. Pat. Nos. 3,893,733, 4,133,585, 4,167,295, 4,262,975, and 4,300,806. In addition to the compliant hydrodynamic bearings of the prior art, attempts were made to use foil bearings in conjunction with a magnetic field such as shown in U.S. Pat. No. 4,167,295.

The compliant foil gas bearings suffer from low capacity and low damping capability when compared to more conventional oil film type bearings.

As shown by the prior art, an attempt was made to increase damping and load capacity of compliant foil gas bearings using a tapered land configuration which is simulated by using a varying bump foil stiffness technique such as shown in the '975 Patent. The '806 Patent shows a dual bump foil configuration that was another attempt to increase the load capacity and damping capability of the bump foil compliant gas bearing.

SUMMARY OF THE INVENTION

A conventional three pad compliant foil gas bearing modified to provide a gas pressure force created by each pad wherein the pressure forces are spaced approximately 120° C. from one another resulting in a three lobe compliant foil gas bearing that exhibits increased load capacity and damping when compared to the standard three pad compliant foil gas bearing configuration. Applicant has found that placing shims under the bump foils of a conventional three pad compliant foil gas bearing achieves the necessary pressure forces thus imparting a three lobed configuration on the rotating shaft. The three lobed configuration permits higher shaft speeds by increasing the stiffness and damping capacity of the prior art three pad compliant gas foil bearing.

DETAILED DESCRIPTION OF THE INVENTION

Figure 1:
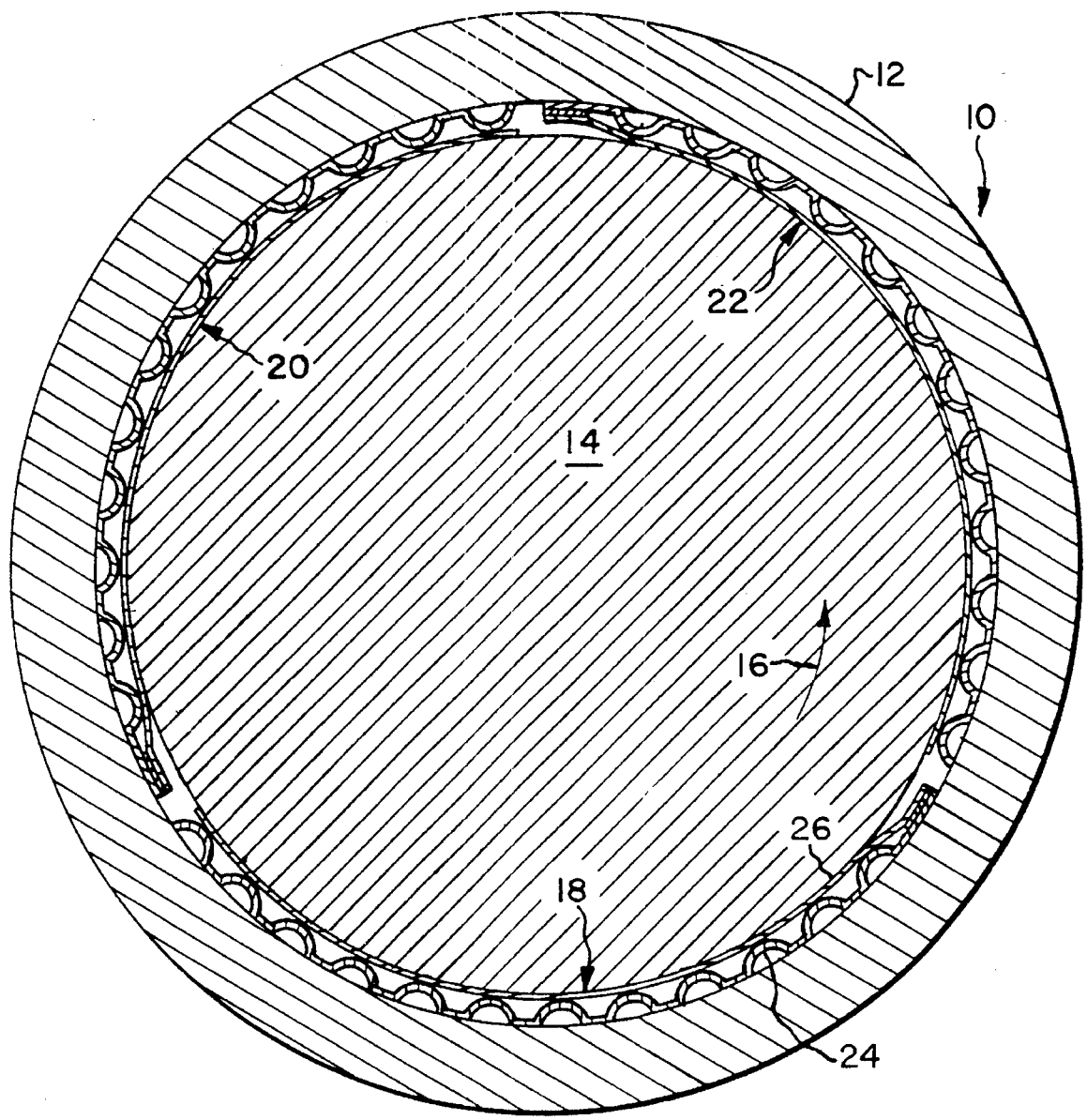
FIG. 1 is a cross-sectional view of a three pad compliant foil gas bearing according to the prior art.

Referring the FIG. 1, a conventional three pad compliant foil gas bearing assembly is shown generally as 10. Foil gas bearing assembly 10 includes a journal sleeve or bushing 12 which supports a shaft 14 for rotation in the direction shown by arrow 16. Disposed on the inside of the sleeve 12 are three bump foil assemblies 18, 20, and 22 consisting of a bump foil 24 covered by a flat foil 26 (assembly 18). Bump foil assemblies 18, 20, and 22 are spaced equally around the inner circumference of the sleeve 12 as shown. When the assembly 10 is mounted so that the shaft 14 is free to rotate, air or other gaseous medium is introduced into the space between the sleeve 12 and the shaft 14 to provide the compliant foil gas bearing. The film of air or gas acts as the means to support the shaft 14 during a rotation and provide lubrication. The conventional three pad compliant foil gas bearings load capacity and damping capabilities are low when compared to oil film bearings.

Figure 2:
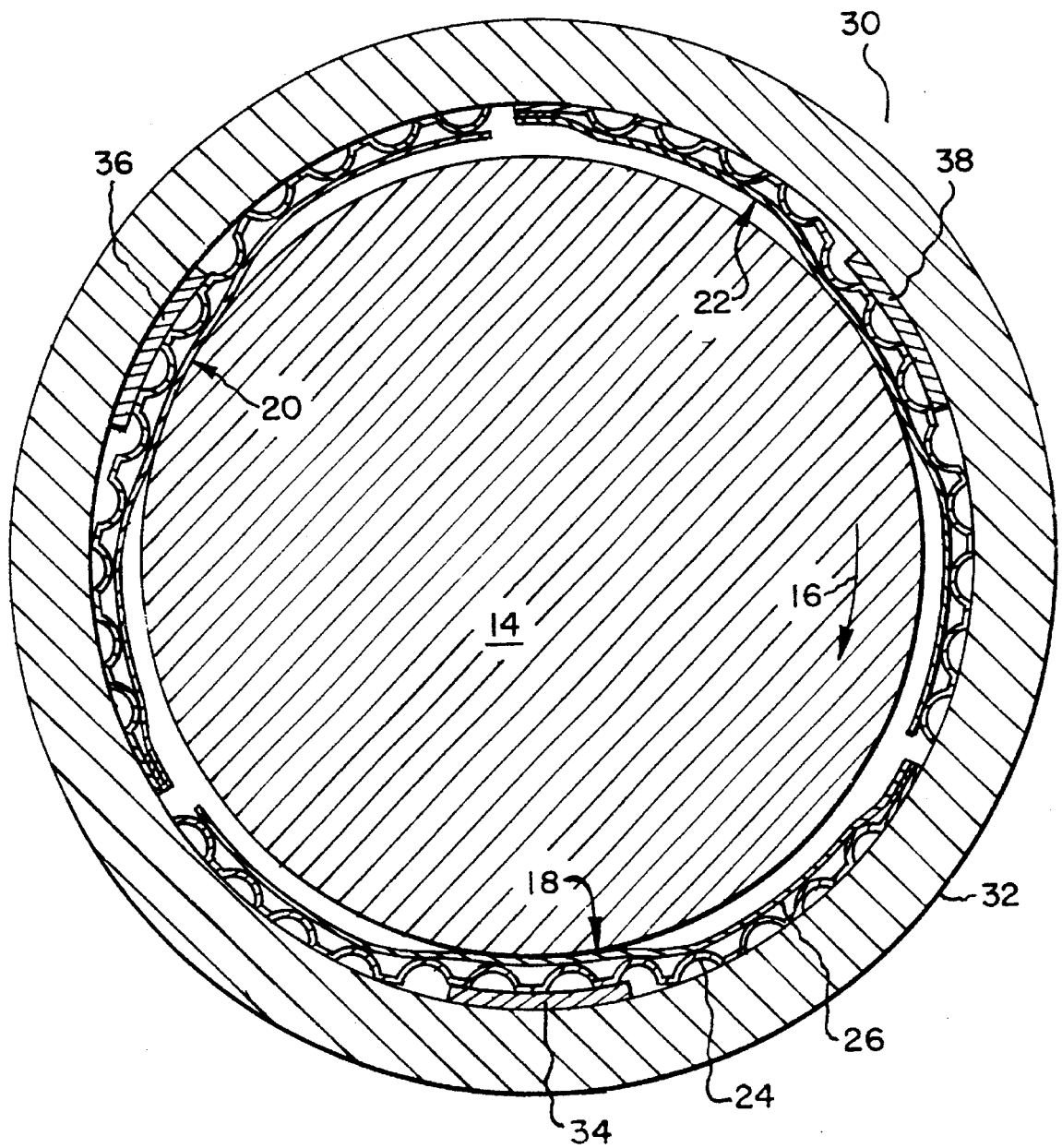
FIG. 2 is a cross-sectional view of a three lobe compliant foil gas bearing according to the present invention.

As shown in FIG. 2, the three pad compliant foil gas bearing is converted into a three lobe compliant gas bearing assembly 30 by introducing means, e.g. shims 34, 36, and 38 underneath the bump foil assemblies 18, 20, and 22. The shims 34, 36, and 38 (shown enlarged for the purpose of illustration) can be thin metal pieces placed 120° C. apart around the inner circumference of the sleeve 32. A shimmed three lobe compliant foil gas bearing, according to the present invention, offers increased load capacity and damping when compared to a standard three pad compliant foil gas bearing. A shimmed three lobe compliant foil bearing provides three gas pressure forces acting at 120 degrees from one another to stabilize and center the shaft in the bearing. The shimmed bump foil support is also more compliant which allows for more Coulomb damping while operating under light loads.

Figure 3:
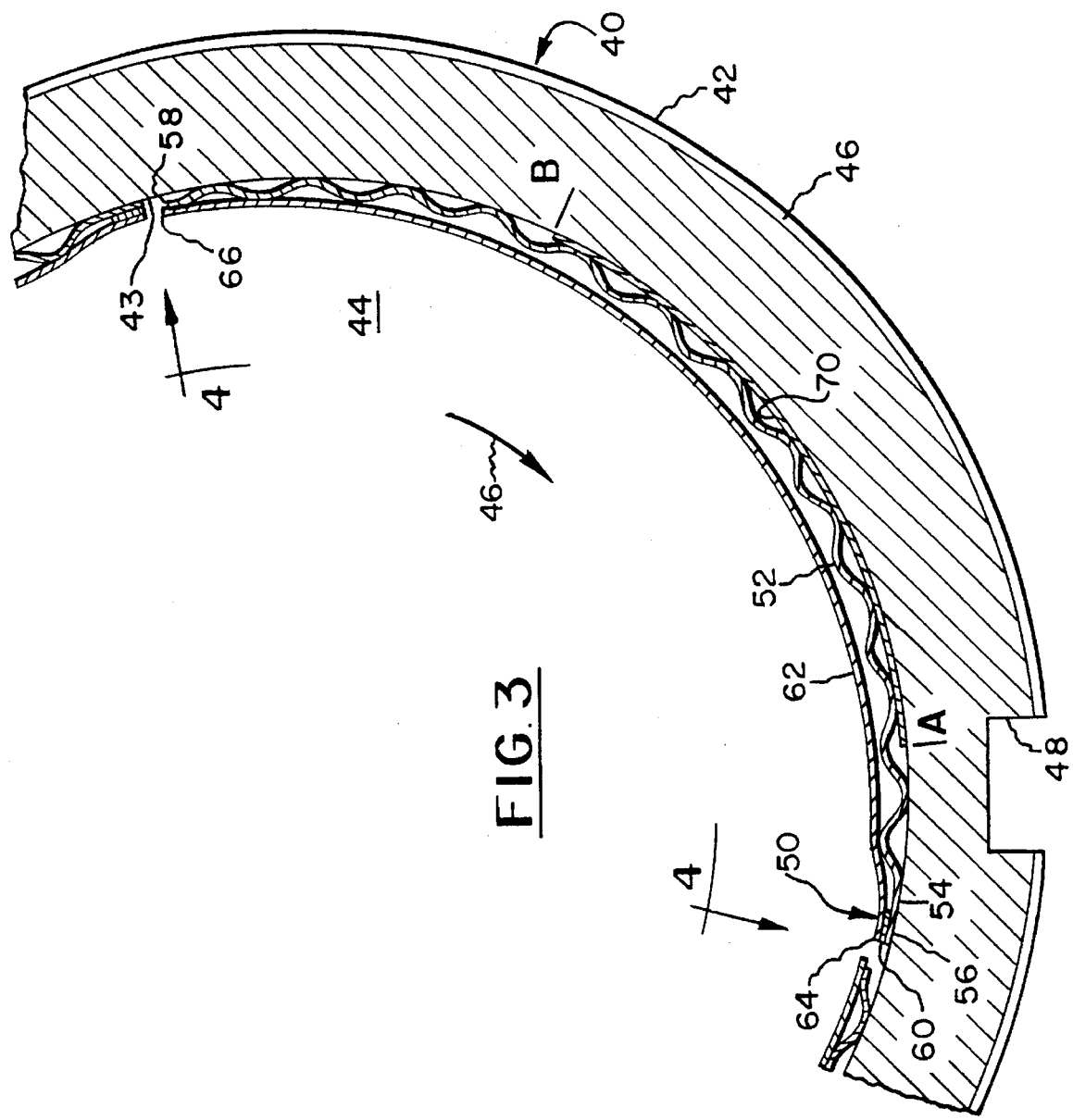
FIG. 3 is an enlarged partial section of a three lobe compliant foil gas bearing according to the present invention.

Referring to FIG. 3, a bearing assembly 40 includes a journal sleeve 42 which has a chamfered outer edge 46 and is provided with one or more keyways 48 to fix the sleeve inside of a housing (not shown) as is well known in the art. A shaft 44 (not shown) is adapted for rotation inside the sleeve in the direction shown by arrow 46.

Figure 4:
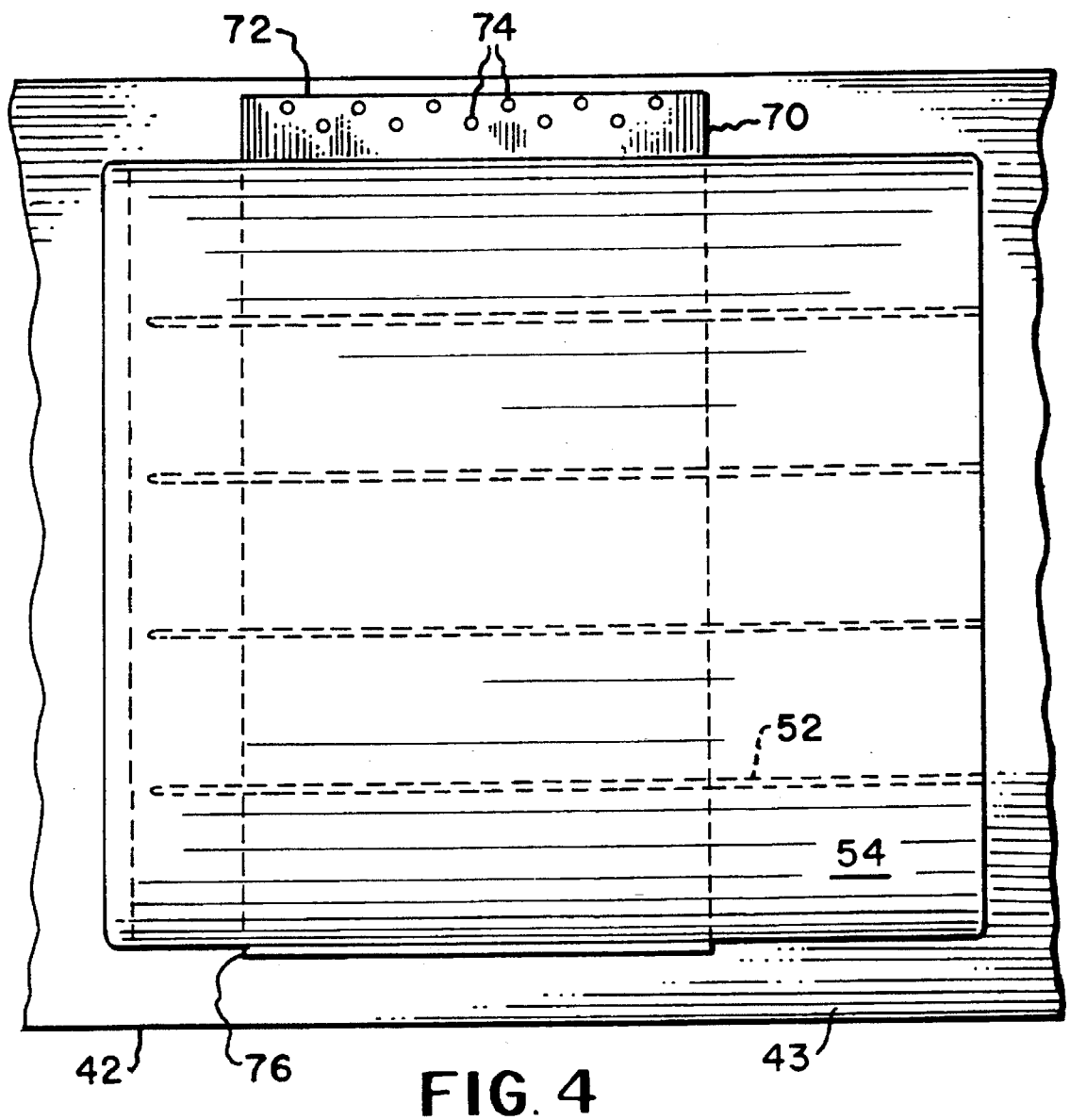
FIG. 4 is a top view taken along line 4—4 of FIG. 3 showing the arrangement of the bump foil assembly and pressure force increasing means according to the present invention, the assembly being shown flattened for the purposes of clarity.

A bump foil assembly 50 consisting of a bump foil 52 is fixed to the inner circumference 43 of sleeve 42 at location 54 by a series of spot welds and extends for approximately ⅓ the circumference of the sleeve 42 as shown in the drawing. First or fixed end 56 of the bump foil 52 is fixed to the inner surface 43 of sleeve 42 and the second or free end 58 of bump foil 52 is free to move circumferentially around the inside surface 43 of the sleeve 42. A spacer 60 is spot welded on the first end 56 of bump foil 52. A smooth foil 62 has a first or fixed end 64 spot welded on the spacer 60, the smooth foil extends for a length commensurate with the bump foil 52. The second or free end 66 of the smooth foil 62 proximate the end 58 of the bump foil 52 is free to move around the inner circumference of the sleeve 42 in a manner identical to that of the bump foil 52. A thin shim 70 is placed underneath the bump foil 52 extending from a location under the second bump to a location covering approximately 30 to 70% of the length of the bump foil 52 as shown by the letters A and B. Shim 70 extends transverse to the bump foil 52 and the smooth foil 54 as shown in FIG. 4. Shim 70 has a fastening end 72 so that the shim can be fastened to the inner surface 43 of the sleeve 42 by a series of spot welds 74. The second or free end 76 of shim 70 projects a slight distance beyond the width of the bump foil 52 and the smooth foil 54. When the bump foil assembly 50 is installed in the sleeve 42 it is necessary that the smooth foil 62 contact at least the first and last bumps of the bump foil S2 shown in FIG. 3.

As is known in the art, the bump foils 52 are provided with a series of longitudinal slits which are shown in dotted line in FIG. 4 to accommodate for differential expansion of the bump foil 52 as a shaft load is applied. It is also known in the art, to provide the smooth foil 62 with a surface coating such as Emalon 333 supplied by Acheson Colloids Company of Port Huron, Mich. The coating provides a dry lubricant during start-up and shut-down when shaft speeds are too low to generate a gas film strong enough to support the shaft.

Bump foil 52 and smooth foil 54 are made of a nickel alloy sold under the tradename Inconel and are approximately 0,002 to 0.012 inches thick. The shim 70 (shims 34, 36, and 38 of FIG. 2) are preferably made from a chromium nickel stainless steel such as AISI type 302 stainless preferably having a surface hardness between 40 and 45 on the Rockwell C scale. The shims are approximately 0.001 to 0.004 inches thick with the length and width being determined by the size of the pad of the compliant foil gas bearing to which it is applied, e.g., the size and application for which the bearing is intended.

When a bearing assembly, according to the present invention, is installed in a high speed machine such as a turbo expander, the shims act in a manner to convert the standard three pad compliant foil gas bearing into a three lobe compliant foil gas bearing by virtue of the three gas pressure forces acting 120° C. from each other to stabilize and center the shaft in the bearing. The shimmed bump foil assembly, according to the present invention is more compliant which provides more Coulomb damping while the turbo machine is operating under light loads.

According to the present invention, the assembly increases the stiffness and damping characteristics of the compliant foil gas bearing, thus permitting operation at higher speeds than permitted by prior art compliant gas foil bearings.

A turbo expander with prior art gas foil bearings could not maintain stable operation above 39,000 RPM. After changing the bearings to those of the present invention, e.g., shimmed compliant gas foil, the turbo expander could operate above 50,000 RPM with only 0.3 mils total vibration.

The expander using bearings, according to the present invention, has been in continuous operation for almost a year running at a speed of 43,000 to 46,000 RPM.

Using flat shims to provide a three lobe geometry insures that the three lobe geometry will always be present regardless of the speed of rotation of the shaft or the load on the pad, unlike other designs which rely on pad load and hydrodynamic pressure to deform the pads into a tapered geometry.

Having thus described my invention, what is desired to be secured by the Letters Patent of the United States is set for in the appended claims.

1. In a compliant foil gas bearing of the type consisting of a generally cylindrical journal sleeve housing having at least three bump foil assemblies disposed at locations approximately 120° C. apart on an inner surface of said housing each of said bump foil assemblies having an end fixed to said sleeve and a free end extending to a location proximate a fixed end of an adjacent bump foil assembly, the improvement comprising:

means to create pressure forces from each bump foil assembly said means placed under a portion of each of said bump foil assemblies proximate said fixed end of each bump foil assembly, whereby said bearing provides three gas pressure forces acting at approximately 120° C. from one another to stabilize and center a shaft installed in said bearing during high speed rotation of said shaft.

2. A bearing according to claim 1 wherein said means comprises individual thin shims placed under said bump foil assemblies.

3. A bearing according to claim 2 wherein, depending upon the size and application for said bearing, each of said shims is a metal foil approximately 0.001 to 0,004 inches thick.

4. A bearing according to claim 3 wherein said metal is stainless steel having a minimum surface hardness of 40 measured on the Rockwell C scale.

5. A bearing according to claim 1 wherein said means is a thin metal shim having a length greater than the width of said bump foil assembly and a width narrower than the length of said bump foil assembly.

6. A bearing according to claim 5 wherein one end of said shim is fixed to said sleeve.

7. A bearing according to claim 5 wherein said shim is placed under said bump foil assembly and covers 30 to 70% of the length of the bump foil assembly.

8. A method for increasing the load capacity and dampening characteristics of a three pad compliant foil gas beading, which is disposed on inner surface a generally cylindrical journal sleeve housing, used to support a shaft for rotation at high speed, comprising:

establishing three gas pressure forces one hundred and twenty degrees apart acting between each pad of said gas bearing and said shaft, where in said pressure force is established by inserting a thin metal shim between each pad and said sleeve housing.

9. A method according to claim 8 wherein said shim is prepared from a chromium nickel stainless steel sheet having a surface hardness of a least 40 measured on the Rockwell C scale.

* * * * *

UNITED STATES PATENT AND TRADEMARK OFFICE
CERTIFICATE OF CORRECTION

PATENT NO. : 5,498,083
DATED : Mar. 12, 1996
INVENTOR(S) : William R. Brown

It is certified that error appears in the above-identified patent and that said Letters Patent is hereby corrected as shown below:

Column 4, Line 10
   Delete "C."

Signed and Sealed this

Sixth Day of August, 1996

Attest:

BRUCE LEHMAN

*Attesting Officer*      *Commissioner of Patents and Trademarks*